(12) United States Patent
Morino

(10) Patent No.: US 7,415,157 B2
(45) Date of Patent: Aug. 19, 2008

(54) IMAGE PICKUP APPARATUS

(75) Inventor: Takashi Morino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 10/669,289

(22) Filed: Sep. 24, 2003

(65) Prior Publication Data
US 2005/0030390 A1 Feb. 10, 2005

(30) Foreign Application Priority Data

Sep. 24, 2002 (JP) ............................ 2002-277887
Sep. 24, 2002 (JP) ............................ 2002-277888

(51) Int. Cl.
G06K 9/00 (2006.01)
G06K 9/36 (2006.01)
G06K 9/46 (2006.01)
H04L 9/00 (2006.01)

(52) U.S. Cl. .................. 382/232; 382/166; 713/176

(58) Field of Classification Search ................ 382/166, 382/232; 348/207.99, 231.6; 713/176
See application file for complete search history.

(56) References Cited

U.S. PATENT DOCUMENTS

| | | | | |
|---|---|---|---|---|
| 5,038,392 A * | 8/1991 | Morris et al. | ............... | 382/175 |
| 5,764,286 A * | 6/1998 | Kawamura et al. | ........ | 348/231.6 |
| 6,320,521 B1 * | 11/2001 | Har et al. | ....................... | 341/50 |
| 6,728,466 B1 * | 4/2004 | Tanaka | ........................ | 386/46 |
| 6,807,365 B1 | 10/2004 | Aoki | | |
| 6,889,324 B1 | 5/2005 | Kanai et al. | | |
| 6,968,058 B1 | 11/2005 | Kondoh et al. | | |
| 7,046,817 B2 | 5/2006 | Kamijoh et al. | | |
| 2001/0041015 A1* | 11/2001 | Chui | ........................ | 382/240 |
| 2002/0060736 A1 | 5/2002 | Wakao et al. | ............... | 348/207 |
| 2002/0143792 A1* | 10/2002 | Belu | ......................... | 707/200 |
| 2003/0043852 A1* | 3/2003 | Tadayon et al. | ............ | 370/477 |
| 2004/0028049 A1* | 2/2004 | Wan | ........................ | 370/394 |

FOREIGN PATENT DOCUMENTS

| | | | |
|---|---|---|---|
| EP | 1211587 A1 * | 6/2002 | |
| JP | 10-105057 | 4/1998 | |
| JP | 11-308564 | 11/1999 | |

(Continued)

OTHER PUBLICATIONS

Marvel et al. ("Compression-Compatible Fragile and Semi-Fragile Tamper Detection," Proceedings of SPIE, vol. 3971, 2000, pp. 131-139).*

(Continued)

Primary Examiner—Yubin Hung
(74) Attorney, Agent, or Firm—Morgan & Finnegan, LLP

(57) ABSTRACT

An image pickup apparatus includes an image pickup unit, an image compression unit and an inspection data generating unit. The image pickup unit captures an image and generates image data. The image compression unit compresses the image data in accordance with an image compression method selected from a first image compression method and a second image compression method, and generates compressed image data. The inspection data generating unit generates inspection data necessary to inspect whether the compressed image data is modified. A generation method of the inspection data is varied according to the selected image compression method. The inspection data generating unit adds first data and second data to the compressed image data. The first data indicates the generation method of the inspection data and the second data indicates a location of the compressed image data.

11 Claims, 7 Drawing Sheets

FOREIGN PATENT DOCUMENTS

| | | |
|---|---|---|
| JP | 2000-215379 | 8/2000 |
| JP | 2000-341632 | 12/2000 |
| JP | 2001-203878 | 7/2001 |
| JP | 2002-244924 | 8/2002 |

OTHER PUBLICATIONS

TIFF, rev. 6.0, Adobe Developers Association, Jun. 3, 1992, pp. 13-18.*

Marvel et al. ("Compression-Compatible Fragile and Semi-Fragile Tamper Detection," Proceedings of SPIE, vol. 3971, (2000), pp. 131-139).*

Japanese Search Report dated Apr. 14, 2005.

Japanese Office Action dated Dec. 18, 2007 for Appl. No. 2002-277888.

* cited by examiner

IMAGE PICKUP APPARATUS

BACKGROUND OF THE INVENTION

1. Field of the Invention

The present invention relates to an image pickup apparatus (such as a digital camera) for recording inspection data (data to inspect whether image data is modified or not) for image data of a picked-up image together with the image data onto a recording medium.

2. Related Background Art

Some currently available digital cameras employ recording methods including a JPEG method and a RAW method. The JPEG method is a recording method for adjusting image data of a picked-up image according to plural image adjustment values, compressing the adjusted image data according to a JPEG compression method in conformity with the ISO/IEC 10918-1 standard, and recording JPEG image data obtained by compression together with its additional data. The RAW method is a recording method for compressing image data of a picked-up image according to a lossless compression method, which is an image compression method causing no image deterioration, and recording RAW image data obtained by compression together with its additional data.

In the case where image data of a picked-up image is added with inspection data necessary to inspect whether the image data is modified or not, a generation method of inspection data may preferably be selected according to the recording method adopted for the image data. For example, RAW image data is generally larger in data amount than JPEG image data, so that it is desirable that a generation method of inspection data intended for the RAW image data be faster in processing speed than a generation method of inspection data intended for the JPEG image data.

However, no currently available digital cameras can attain to select the generation method of inspection data according to the recording method of image data.

If the currently available digital cameras are arranged to enable the selection of the generation method of inspection data according to the recording method of image data, it is necessary to notify an inspection device of the generation method of inspection data. In addition, it is necessary to notify the inspection device of a location of data for which inspection data is intended.

However, the currently available digital cameras are capable of neither notifying the inspection device of the generation method of inspection data, nor notifying the inspection device of the location of data for which inspection data is intended.

SUMMARY OF THE INVENTION

An object of the present invention is to overcome the above-described drawbacks.

Another object of the present invention is to enable selection of a generation method of inspection data according to a recording method of image data.

Still another object of the present invention is to enable an inspection device to be notified of a generation method of inspection data and the like.

According to a preferred embodiment of the present invention, an image pickup apparatus comprises:

image pickup means for generating image data; and inspection data generating means for generating inspection data necessary to inspect whether the image data is modified or not, wherein a generation method of the inspection data is changed according to a recording method of the image data.

According to another preferred embodiment of the present invention, an image pickup apparatus comprises:

image pickup means for generating image data; and inspection data generating means for, according to one of a first generation method and a second generation method, generating inspection data necessary to inspect whether the image data is modified or not, wherein data indicating a generation method of the inspection data is added to the image data.

Still other objects, features and advantages of the present invention will become fully apparent from the following detailed description of the preferred embodiments.

DESCRIPTION OF THE PREFERRED EMBODIMENTS

Embodiment 1

Hereinafter, with reference to FIGS. 1 to 8, description will be made of Embodiment 1 that is suitable for the present invention.

Figure 1:
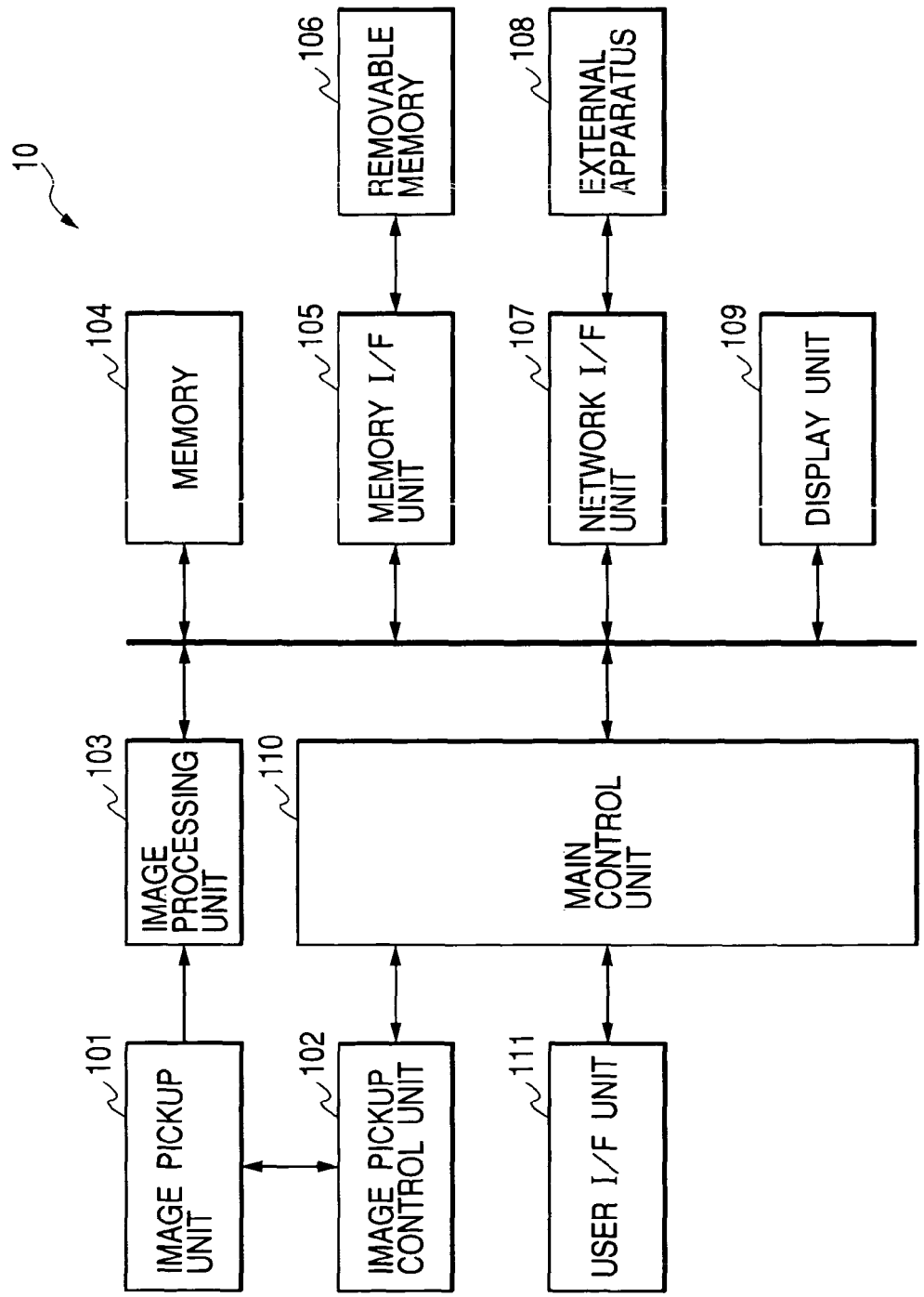
FIG. 1 is a diagram showing a main structure of an image pickup apparatus according to Embodiment 1 of the present invention.

FIG. 1 is a diagram showing a main structure of an image pickup apparatus 10 of Embodiment 1. The image pickup apparatus 10 is an apparatus (for example, a digital camera, a scanner, a copying machine, a portable information terminal with a built-in digital camera, or the like) for generating image data of an object using an image sensor.

In FIG. 1, an image pickup unit 101 is a unit for picking up an image using the image sensor, and generating image data of the picked-up image. An image pickup control unit 102 is a unit for controlling an operation of the image pickup unit 101 according to an instruction from a main control unit 110. The image pickup control unit 102 provides the main control unit 110 with various information relating to the image data generated in the image pickup unit 101.

An image processing unit 103 is a unit for, according to plural image adjustment values set by a user, adjusting a white balance, a sharpness, a contrast, a color density, a hue, a color space, an image quality, a size, etc. of (unadjusted) image data obtained from the image pickup unit 101. The image processing unit 103 is also a unit for compressing adjusted image data according to a lossy (irreversible) image compression method (for example, a JPEG compression method in conformity with the ISO/IEC 10918-1 standard), or compressing the unadjusted image data according to a lossless compression method (an image compression method causing no image deterioration).

A memory 104 is a memory for storing various data. A memory I/F unit 105 is a unit for writing an image file specified by the main control unit 110 into a removable memory 106, or reading out the image file specified by the main control unit 110 from the removable memory 106. The removable memory 106 is capable of storing plural image files.

A network I/F unit 107 is a unit for transmitting the image file specified by the main control unit 110 to an external apparatus 108. The external apparatus 108 is an apparatus that has an application program for remotely controlling the image pickup apparatus 10, and an application program for adjusting the image quality of image data according to plural image adjustment parameters.

A display unit 109 is a unit for displaying reduced image data of the image data generated in the image pickup unit 101, reduced image data of the image file read out from the removable memory 106, or the like. The display unit 109 is also a unit for displaying information on a selected image.

The main control unit 110 is a unit for controlling various functions of the image pickup apparatus 10. A user I/F unit 111 is a unit for notifying the main control unit 110 of an instruction from a user. The user I/F unit 111 includes: a power supply switch for turning on or off the image pickup apparatus 10; a shutter button for instructing a start of an image pickup processing; a recording method selecting button for selecting a recording method for picked-up image data; and an adjustment panel for adjusting the plural image adjustment values.

Figure 2:
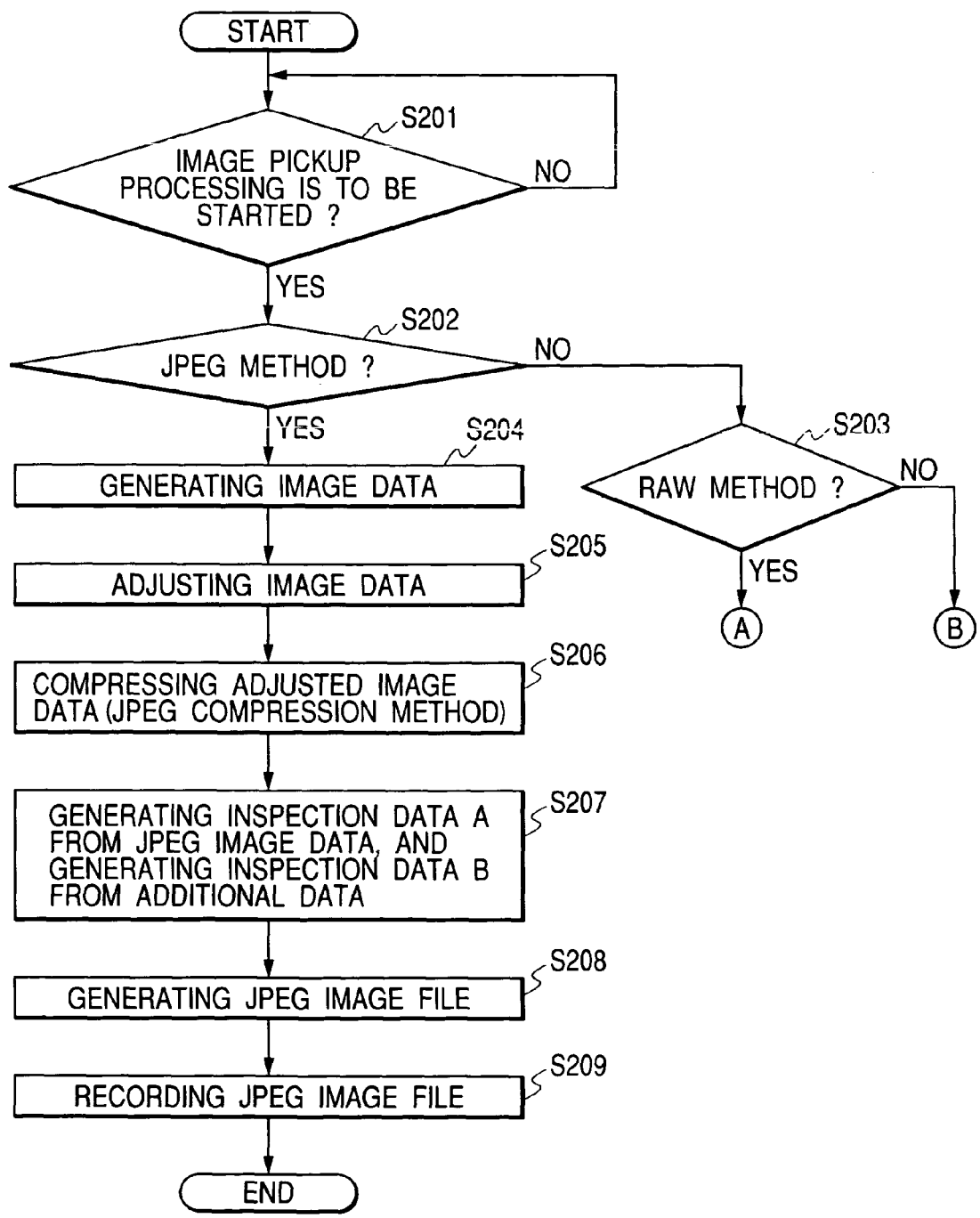
FIG. 2 is a flow chart showing a processing procedure of the image pickup apparatus according to Embodiment 1 of the present invention.
Figure 3:
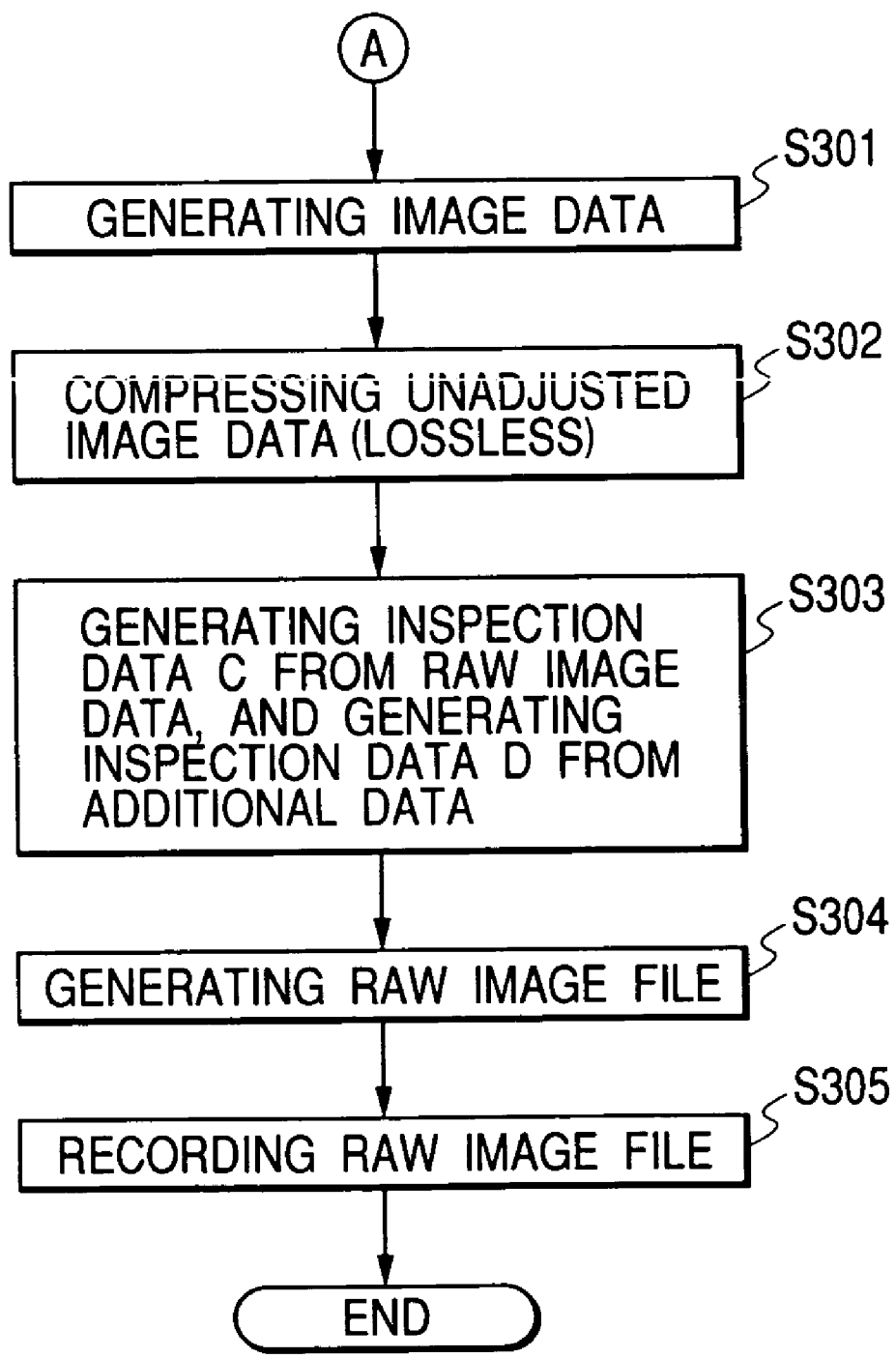
FIG. 3 is a flow chart showing a processing procedure of the image pickup apparatus according to Embodiment 1 of the present invention.
Figure 4:
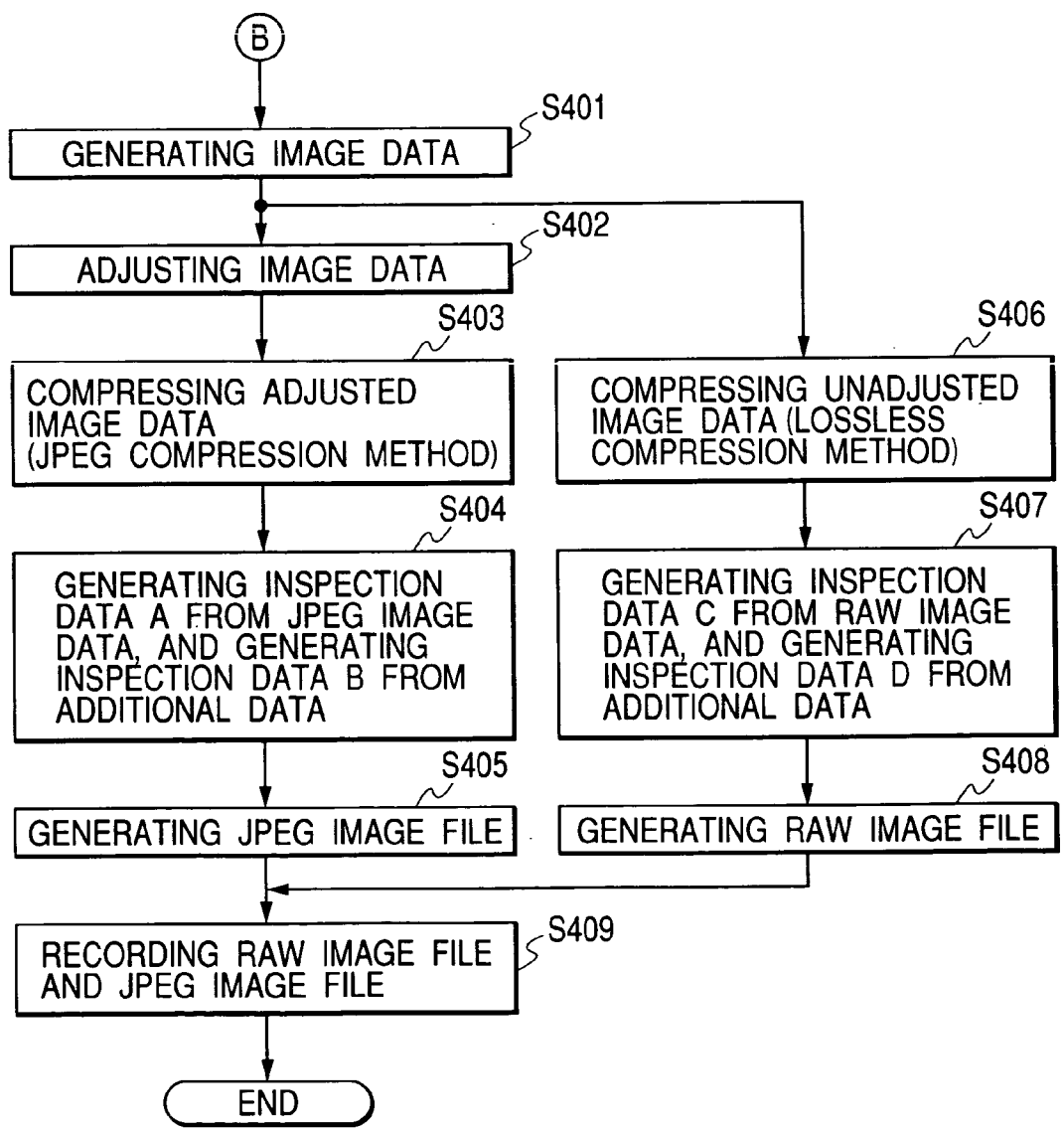
FIG. 4 is a flow chart showing a processing procedure of the image pickup apparatus according to Embodiment 1 of the present invention.

FIGS. 2 to 4 are flow charts showing processing procedures of the image pickup apparatus 10 of Embodiment 1. Note that the processing procedures shown in FIGS. 2 to 4 can be executed in both the cases where a drive mode of the image pickup apparatus 10 is a single-frame image pickup mode and where the drive mode is a continuous image pickup mode. Here, the single-frame image pickup mode is a drive mode for generating and recording single image data. On the other hand, the continuous image pickup mode is a drive mode for continuously generating and recording plural image data.

Step S201 of FIG. 2: The main control unit 110 judges whether a user instructs the start of the image pickup processing or not. If the judgment results show that the user instructs the start of the image pickup processing, the procedure advances to step S202. On the other hand, if the judgment results at step S201 show that the user does not instruct the start of the image pickup processing, the procedure repeats step S201.

Step S202 of FIG. 2: The main control unit 110 judges whether the recording method set by the user is a JPEG method (first recording method) or not. If the judgment results show that the recording method is the JPEG method, the procedure advances to step S204. On the other hand, if the judgment results show that the recording method is not the JPEG method, the procedure advances to step S203.

Step S203 of FIG. 2: The main control unit 110 judges whether the recording method set by the user is a RAW method (second recording method) or not. If the judgment results show that the recording method is the RAW method, the procedure advances to a processing "A" (step S301). If the judgment results show that the recording method is not the RAW method but a RAW+JPEG method (third recording method), the procedure advances to a processing "B" (step S401).

Step S204 of FIG. 2: The image pickup unit 101 picks up an image using the image sensor, and generates image data of the picked-up image.

Step S205 of FIG. 2: According to plural image adjustment values set by the user, the image processing unit 103 adjusts a white balance, a sharpness, a contrast, a color density, a hue, a color space, an image quality, a size, etc. of (unadjusted) image data generated at step S204.

Step S206 of FIG. 2: The image processing unit 103 compresses the adjusted image data according to the JPEG compression method in conformity with the ISO/IEC 10918-1 standard to generate JPEG image data. Note that in Embodiment 1, the adjusted image data is compressed according to the JPEG compression method, but the JPEG compression method may be replaced by another image compression method (for example, an image compression method based on JPEG-2000).

Step S207 of FIG. 2: After the JPEG image data is generated, according to a first generation method (see FIG. 7), the main control unit 110 generates inspection data A from the JPEG image data. Here, the inspection data A is data necessary to inspect whether the JPEG image data is modified or not. Further, according to the first generation method (see FIG. 7), the main control unit 110 generates inspection data B from additional data of the JPEG image data. Here, the additional data is data including various information relating to the JPEG image data. More specifically, the additional data includes device ID data indicating an identifier unique to the image pickup apparatus 10, image quality data indicating an image quality of the JPEG image data, and size data indicating a size of the JPEG image data. Also, the inspection data B is data necessary to inspect whether the additional data is modified or not.

Step S208 of FIG. 2: After the inspection data A and the inspection data B are generated, the main control unit 110 generates a JPEG image file that includes the JPEG image data, the additional data, algorithm data A, position data A, the inspection data A, algorithm data B, position data B, and the inspection data B. Then, the main control unit 110 writes the generated JPEG image file into the memory 104.

Figure 5:
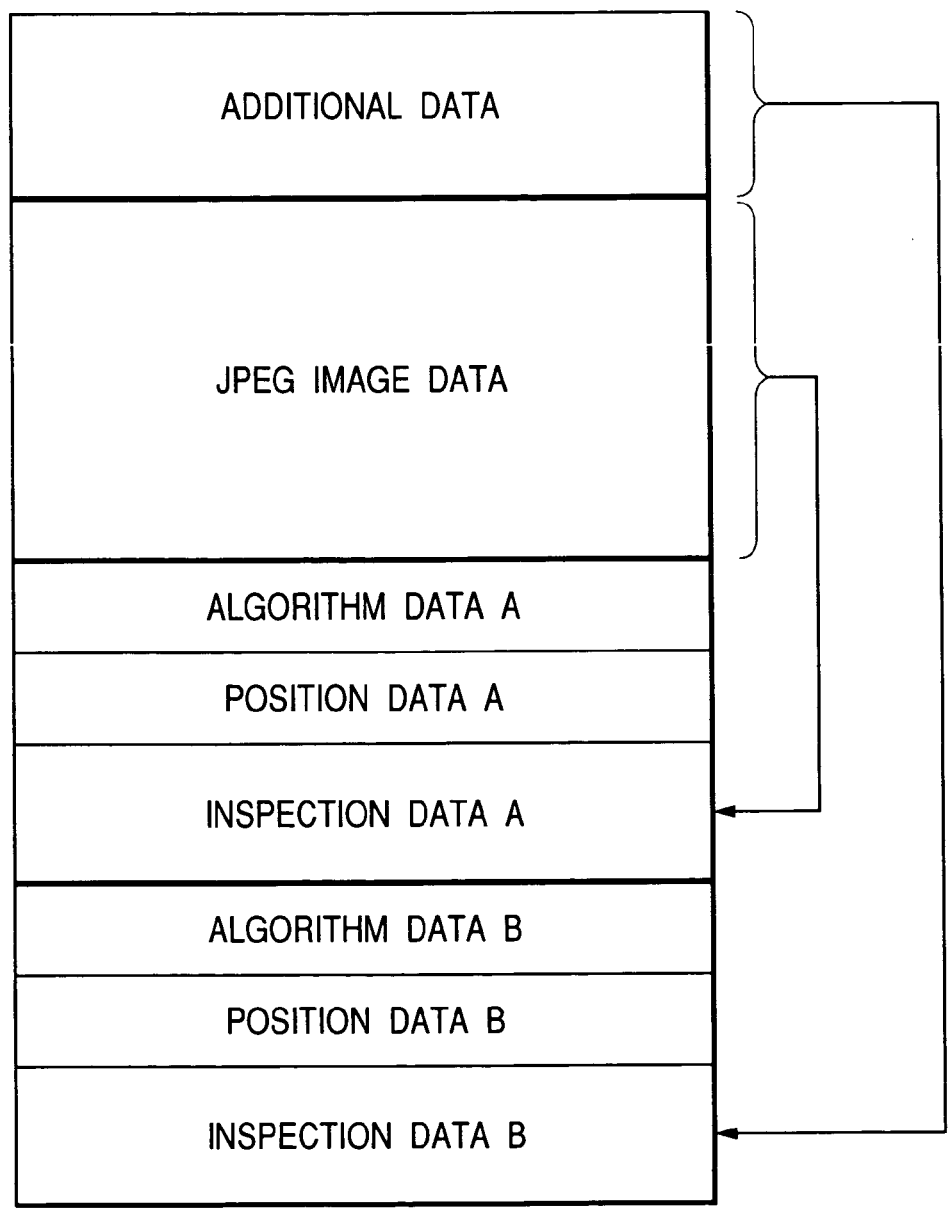
FIG. 5 is a diagram showing a structure of a JPEG image file according to Embodiment 1 of the present invention.

FIG. 5 shows an example of a structure of the above-mentioned JPEG image file. Here, the algorithm data A is data indicating a generation method of the inspection data A (the first generation method in Embodiment 1). By adding the algorithm data A to the JPEG image data, an inspection device can be notified of the generation method of the inspection data A. Also, the position data A is data indicating a location of data for which the inspection data A is intended (the JPEG image data in Embodiment 1). By adding the position data A to the JPEG image file, the inspection device can be notified of the location of the data for which the inspection data A is intended.

Also, the algorithm data B is data indicating a generation method of the inspection data B (the first generation method in Embodiment 1). By adding the algorithm data B to the JPEG image data, the inspection device can be notified of the generation method of the inspection data B. Also, the position data B is data indicating a location of data for which the inspection data B is intended (the additional data of the JPEG image data in Embodiment 1). By adding the position data B to the JPEG image file, the inspection device can be notified of the location of the data for which the inspection data B is intended.

Step S209 of FIG. 2: After the JPEG image file is generated, the memory I/F unit 105 reads the JPEG image file from the memory 104, and records the read JPEG image file onto the removable memory 106.

Step S301 of FIG. 3: The image pickup unit 101 picks up an image using the image sensor, and generates image data of the picked-up image.

Step S302 of FIG. 3: The image processing unit 103 compresses (unadjusted) image data generated at step S301 according to the lossless compression method, which is an image compression method causing no image deterioration, to generate RAW image data.

Step S303 of FIG. 3: After the RAW image data is generated, according to a second generation method (see FIG. 8) faster in processing speed than the first generation method, the main control unit 110 generates inspection data C from the RAW image data. Here, the inspection data C is data necessary to inspect whether the RAW image data is modified or not. Also, the second generation method is one type of method of generating inspection data, in which the inspection data for intended data is generated by using a hash function faster than a hash function used in the first generation method.

Further, according to the second generation method (see FIG. 8) faster in processing speed than the first generation method, the main control unit 110 generates inspection data D from additional data of the RAW image data. Here, the additional data is data including various information relating to the RAW image data. More specifically, the additional data includes the device ID data indicating the identifier unique to the image pickup apparatus 10 and other such data. Also, the inspection data D is data necessary to inspect whether the additional data is modified or not.

Step S308 of FIG. 3: After the inspection data C and the inspection data D are generated, the main control unit 110 generates a RAW image file that includes the RAW image data, the additional data, image adjustment data, algorithm data C, position data C, the inspection data C, algorithm data D, position data D, and the inspection data D. Then, the main control unit 110 writes the generated RAW image file into the memory 104.

Figure 6:
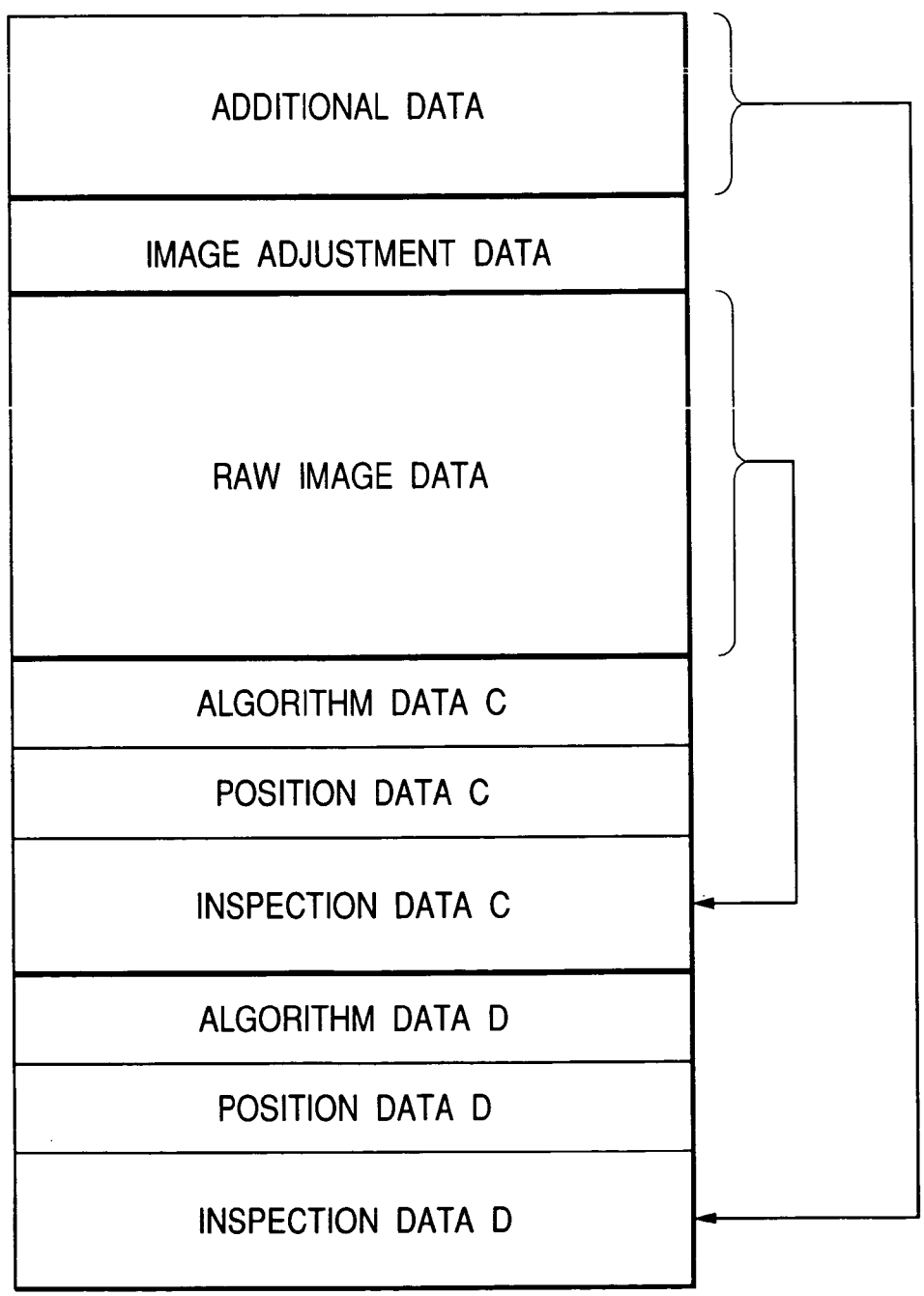
FIG. 6 is a diagram showing a structure of a RAW image file according to Embodiment 1 of the present invention.

FIG. 6 shows an example of a structure of the above-mentioned RAW image file. Here, the image adjustment data is data indicating an image adjustment value at the time of generating the RAW image data. Also, the algorithm data C is data indicating a generation method of the inspection data C (the second generation method in Embodiment 1). By adding the algorithm data C to the RAW image file, the inspection device can be notified of the generation method of the inspection data C. Also, the position data C is data indicating a location of data for which the inspection data C is intended (the RAW image data in Embodiment 1). By adding the position data C to the RAW image file, the inspection device can be notified of the location of the data for which the inspection data C is intended.

The algorithm data D is data indicating a generation method of the inspection data D (the second generation method in Embodiment 1). By adding the algorithm data D to the RAW image file, the inspection device can be notified of the generation method of the inspection data D. Also, the position data D is data indicating a location of data for which the inspection data D is intended (the additional data of the RAW image data in Embodiment 1). By adding the position data D to the RAW image file, the inspection device can be notified of the location of the data for which the inspection data D is intended.

Step S305 of FIG. 3: After the RAW image file is generated, the memory I/F unit 105 reads out the RAW image file from the memory 104, and records the read RAW image file onto the removable memory 106.

Step S401 of FIG. 4: The image pickup unit 101 picks up an image using the image sensor, and generates image data of the picked-up image.

Step S402 of FIG. 4: According to plural image adjustment values set by the user, the image processing unit 103 adjusts a white balance, a sharpness, a contrast, a color density, a hue, a color space, an image quality, a size, etc. of (unadjusted) image data generated at step S401.

Step S403 of FIG. 4: The image processing unit 103 compresses the adjusted image data according to the JPEG compression method to generate JPEG image data.

Step S404 of FIG. 4: After the JPEG image data is generated, according to the first generation method (see FIG. 7), the main control unit 110 generates the inspection data A from the JPEG image data. Here, the inspection data A is the data necessary to inspect whether the JPEG image data is modified or not. Further, according to the first generation method (see FIG. 7), the main control unit 110 generates the inspection data B from the additional data of the JPEG image data.

Here, the additional data is the data including various information relating to the JPEG image data. More specifically, the additional data includes the device ID data indicating the identifier unique to the image pickup apparatus 10, the image quality data indicating the image quality of the JPEG image data, and the size data indicating the size of the JPEG image data. Also, the inspection data B is the data necessary to inspect whether the additional data is modified or not.

Step S405 of FIG. 4: After the inspection data A and the inspection data B are generated, the main control unit 110 generates the JPEG image file that includes the JPEG image data, the additional data, the algorithm data A, the position data A, the inspection data A, the algorithm data B, the position data B, and the inspection data B. Then, the main control unit 110 writes the generated JPEG image file into the memory 104. FIG. 5 shows an example of the structure of the JPEG image file.

Step S406 of FIG. 4: The image processing unit 103 compresses the (unadjusted) image data generated at step S401 according to the lossless compression method to generate RAW image data.

Step S407 of FIG. 4: After generetion of the RAW image data terminates, according to the second generation method (see FIG. 8) faster in processing speed than the first generation method, the main control unit 110 generates the inspection data C from the RAW image data. Here, the inspection data C is the data necessary to inspect whether the RAW image data is modified or not. Also, the second generation method is one type of method of generating inspection data, in which the inspection data of subject data is generated by using the hash function faster than the hash function used in the first generation method. Further, according to the second generation method (see FIG. 8) faster in processing speed than the first generation method, the main control unit 110 generates the inspection data D from the additional data of the RAW image data.

Here, the additional data is the data including various information relating to the RAW image data. More specifically, the additional data includes the device ID data indicating the identifier unique to the image pickup apparatus 10 and other such data. Also, the inspection data D is the data necessary to inspect whether the additional data is modified or not.

Step S408 of FIG. 4: After the inspection data C and the inspection data D are generated, the main control unit 110 generates a RAW image file that includes the RAW image data, the additional data, the algorithm data C, the position data C, the inspection data C, the algorithm data D, the position data D, and the inspection data D. Then, the main control unit 110 writes the generated RAW image file into the memory 104. FIG. 6 shows an example of the structure of the RAW image file.

Note that in order to perform an image pickup processing for image data of a single frame at a high speed, the image pickup apparatus 10 of Embodiment 1 is arranged to perform a procedure from step S406 to step S408 while performing a procedure from step S402 to step S405 at the same time. Also, the procedure from step S402 to step S405 is the same as a procedure from step S205 to step S208, and the procedure from step S406 to step S408 is the same as a procedure from step S302 to step S304.

Step S409 of FIG. 4: After the RAW image file and JPEG image file are generated, the memory I/F unit 105 reads out the RAW image file and JPEG image file from the memory 104, and records the read RAW image file and JPEG image file onto the removable memory 106.

Figure 7:
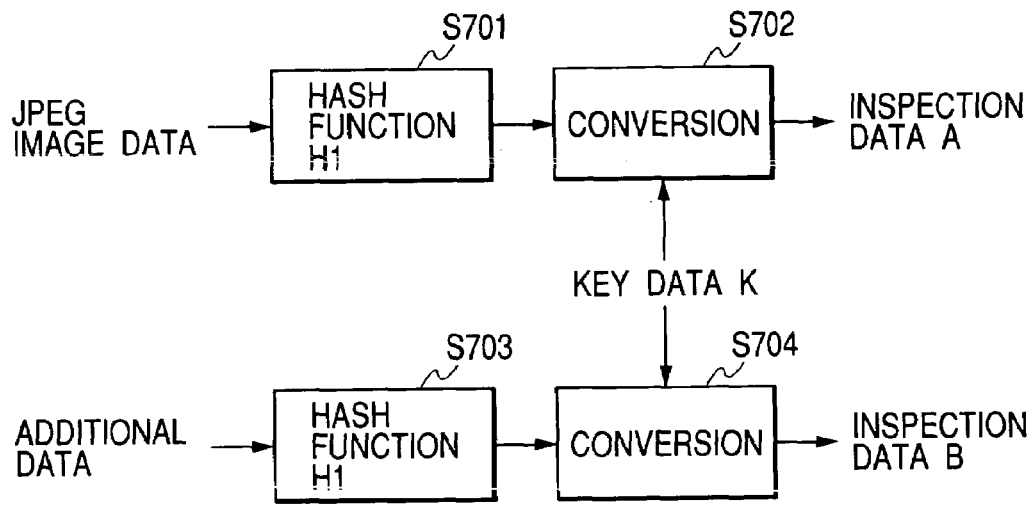
FIG. 7 is a diagram for explaining an example of a first generation method according to Embodiment 1 of the present invention.

FIG. 7 is a flow chart for explaining an example of the first generation method according to Embodiment 1.

Step S701: The main control unit 110 calculates a hash value A from the JPEG image data using a hash function H1.

Step S702: After calculation of the hash value A, the main control unit 110 converts the hash value A into the inspection data A using key data K. Here, the key data K is data corresponding to a shared key based on shared key cryptography or a secret key based on public key cryptography.

Step S703: The main control unit 110 calculates a hash value B from the additional data of the JPEG image data using the hash function H1.

Step S704: After calculation of the hash value B, the main control unit 110 converts the hash value B into the inspection data B using the key data K.

Figure 8:
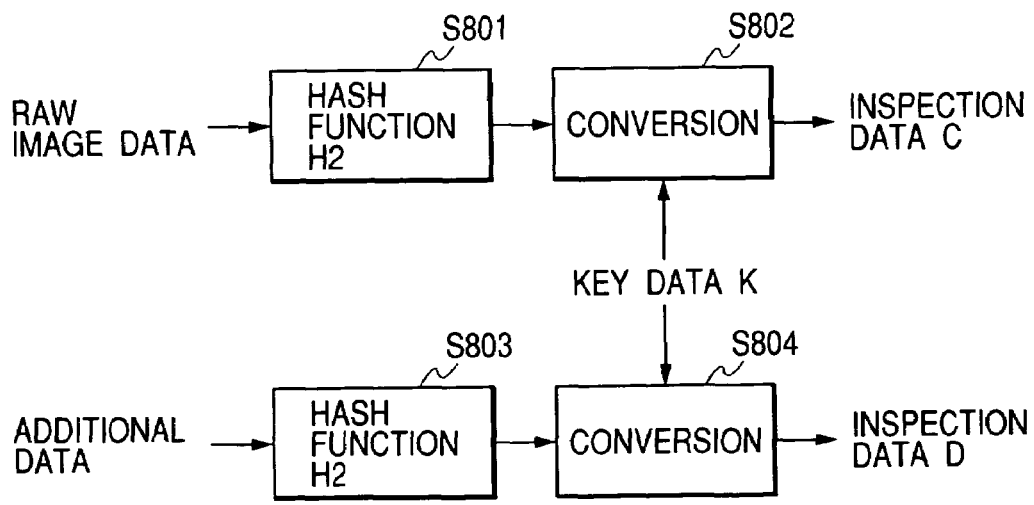
FIG. 8 is a diagram for explaining an example of a second generation method according to Embodiment 1 of the present invention.

FIG. 8 is a flow chart for explaining an example of the second generation method according to Embodiment 1.

Step S801: In order to generate a hash value of the RAW image data at a high speed, the main control unit 110 uses a hash function H2, which is faster than the hash function H1, to calculate a hash value C from the RAW image data.

Step S802: After calculation of the hash value C, the main control unit 110 converts the hash value C into the inspection data C using the key data K. Here, the key data K is the data corresponding to the shared key based on shared key cryptography or the secret key based on public key cryptography.

Step S803: In order to generate the hash value of the additional data of the RAW image data at a high speed, the main control unit 110 uses the hash function H2, which is faster than the hash function H1, to calculate a hash value D from the additional data of the RAW image data.

Step S804: After calculation of the hash value D, the main control unit 110 converts the hash value D into the inspection data D using the key data K.

As described above, according to the image pickup apparatus 10 of Embodiment 1, it is possible to select the generation method of inspection data suitable for the recording method adopted for the image data of the picked-up image.

Further, according to the image pickup apparatus 10 of Embodiment 1, even in the case of recording the image data of the picked-up image according to plural different recording methods at a time, it is possible to select the generation method of inspection data suitable for each recording method.

Further, according to the image pickup apparatus 10 of Embodiment 1, in the case of recording the JPEG image data, the inspection data can be generated from each of the JPEG image data and its additional data. Accordingly, it is possible to separately inspect whether the JPEG image data is modified or not and whether the additional data is modified or not.

Further, according to the image pickup apparatus 10 of Embodiment 1, in the case of recording the RAW image data, the inspection data can be generated from each of the RAW image data and its additional data. Accordingly, it is possible to separately inspect whether the RAW image data is modified or not and whether the additional data is modified or not.

Further, according to the image pickup apparatus 10 of Embodiment 1, in the case where the recording method is the RAW method or the RAW+JPEG method, the inspection data can be generated from the RAW image data and its additional data. Accordingly, it is possible to inspect whether the RAW image data and the additional data of the RAW image data are modified or not.

Further, according to the image pickup apparatus 10 of Embodiment 1, in the case of recording the RAW image data, it is possible to avoid generating the inspection data from the image adjustment data, thereby allowing the image adjustment data to be freely changed.

Further, according to the image pickup apparatus 10 of Embodiment 1, it is possible to add the algorithm data, which is data indicating the generation method of the inspection data, to the JPEG image data or the RAW image data, thereby allowing the inspection device to be notified of the generation method of the inspection data.

Further, according to the image pickup apparatus 10 of Embodiment 1, it is possible to add the position data, which is data indicating the location of the data for which the inspection data is intended, to the JPEG image data or the RAW image data, thereby allowing the inspection device to be notified of the location of the data for which the inspection data is intended.

Embodiment 2

The present invention is not limited to the form of Embodiment 1 described above, and can be implemented in various forms.

For example, one inspection data can also be generated from the JPEG image data and its additional data to be added to the JPEG image file.

Further, one inspection data can also be generated from the RAW image data and its additional data to be added to the RAW image file.

Furthermore, in the case where the recording method is the RAW+JPEG method, the inspection data C and the inspection data D can also be added to the RAW image file, while avoiding adding the inspection data A and the inspection data B to the JPEG image file.

The above-described preferred embodiments are merely exemplary of the present invention, and are not be construed to limit the scope of the present invention.

The scope of the present invention is defined by the scope of the appended claims, and is not limited to only the specific description in this specification. Furthermore, all modifications and changes belonging to equivalents of the claims are considered to fall within the scope of the present invention.

What is claimed is:

1. An image pickup apparatus comprising:
    an image pickup unit which captures an image and generates image data;
    an image compression unit which compresses the image data in accordance with an image compression method selected from a first image compression method and a second image compression method, and generates compressed image data; and an inspection data generating unit which generates first inspection data necessary to inspect whether the compressed image data is modified, a generation method of the first inspection data being varied according to the selected image compression method, wherein said inspection data generating unit adds first data and second data to the compressed image data, and wherein the first data indicates the generation method of the first inspection data and the second data indicates a location of the compressed image data.

2. An image pickup apparatus according to claim 1, wherein the first image compression method conforms to one of JPEG and JPEG-2000, and wherein the second image compression method conforms to a lossless compression method.

3. An image pickup apparatus according to claim 1, wherein the first image compression method conforms to one of JPEG and JPEG-2000.

4. An image pickup apparatus according to claim 1, wherein the second image compression method conforms to a lossless compression method.

5. An image pickup apparatus according to claim 1, wherein said inspection data generating unit further generates second inspection data necessary to inspect whether additional data of the compressed image data is modified, a generation method of the second inspection data being varied according to the selected image compression method.

6. An image pickup apparatus according to claim 5, wherein said inspection data generating unit adds the additional data, third data and fourth data to the compressed image data, and wherein the third data indicates the generation method of the second inspection data and the fourth data indicates a location of the additional data.

7. An image pickup apparatus according to claim 5, wherein the additional data includes at least one of data indicating an identifier unique to said image pickup apparatus, data indicating an image quality of the compressed image data, and data indicating a size of the compressed image data.

8. An image pickup apparatus according to claim 5, further comprising:

a calculation unit which calculates a first hash value from the compressed image data using a hash function and calculates a second hash value from the additional data using the hash function; and a converting unit which converts the first hash value into the first inspection data and converts the second hash value into the second inspection data.

9. An image pickup apparatus according to claim 1, wherein said image pickup apparatus includes a digital camera.

10. An image pickup apparatus according to claim 1, wherein said image pickup apparatus is one of a scanner and a copying machine.

11. An image pickup apparatus according to claim 1, further comprising:

a calculation unit which calculates a hash value from the compressed image data using a hash function; and a converting unit which converts the hash value into the first inspection data.

* * * * *

UNITED STATES PATENT AND TRADEMARK OFFICE
CERTIFICATE OF CORRECTION

PATENT NO. : 7,415,157 B2  Page 1 of 1
APPLICATION NO. : 10/669289
DATED : August 19, 2008
INVENTOR(S) : Takashi Morino It is certified that error appears in the above-identified patent and that said Letters Patent is hereby corrected as shown below:

In the Specification

On the Title Page, item (75), please delete "Takashi Morino, Tokyo (JP)" and insert therefore -- Takashi Morino, Kanagawa (JP) --;

Column 5, line 34, please delete "Step S308" and insert therefore -- Step S304 --;

Column 8, line 53, please delete "are not be construed" and insert therefore -- are not to be construed --.

Signed and Sealed this

Twenty-fifth Day of November, 2008

JON W. DUDAS
*Director of the United States Patent and Trademark Office*